United States Patent
Conway

(10) Patent No.: US 6,722,193 B1
(45) Date of Patent: Apr. 20, 2004

(54) TIRE PRESSURE GAUGE WITH TEMPERATURE CORRECTION

(76) Inventor: David Lee Conway, 30237 Lacledes La., Wesley Chapel, FL (US) 33543-7655

( * ) Notice: Subject to any disclaimer, the term of this patent is extended or adjusted under 35 U.S.C. 154(b) by 0 days.

(21) Appl. No.: 10/388,069

(22) Filed: Mar. 13, 2003

(51) Int. Cl.$^7$ ............................................. B60C 23/02
(52) U.S. Cl. ...................................... 73/146.8; 73/146
(58) Field of Search ................................ 73/146, 146.2, 73/146.3, 146.5, 146.8

(56) References Cited

U.S. PATENT DOCUMENTS

| | | | | |
|---|---|---|---|---|
| 5,435,173 A | * | 7/1995 | Hwang | 73/146.8 |
| 5,450,298 A | * | 9/1995 | Fells et al. | 362/139 |
| 5,837,891 A | * | 11/1998 | Bridge | 73/146.8 |
| 6,034,596 A | * | 3/2000 | Smith et al. | 340/447 |
| 6,055,854 A | * | 5/2000 | Chen | 73/146.8 |
| 6,125,964 A | * | 10/2000 | Tsai | 181/152 |
| 6,557,407 B1 | * | 5/2003 | Huang | 73/146.8 |

* cited by examiner

Primary Examiner—Edward Lefkowitz
Assistant Examiner—Andre Allen

(57) ABSTRACT

A hand-held digital tire pressure gauge is designed such that it will provide valid tire pressure readings even for tires that have an elevated temperature due to the vehicle having been recently driven. The measurement from an ambient (outside) air temperature sensor is subtracted from the measurement of a sensor that employs a unique device for sampling inner tire air temperature and the result is then multiplied by a known factor representing the normal unit of air pressure variance experienced per unit of temperature variance. This value is then subtracted from the measurement of a tire air pressure gauge sensor to derive and display a "corrected" air pressure that the tire would have had if its inner air temperature were equal to the surrounding air temperature. The objective of the gauge is to help the user to realize increased fuel mileage, reduced tire wear, and improved handling and safety of the vehicle.

9 Claims, 4 Drawing Sheets

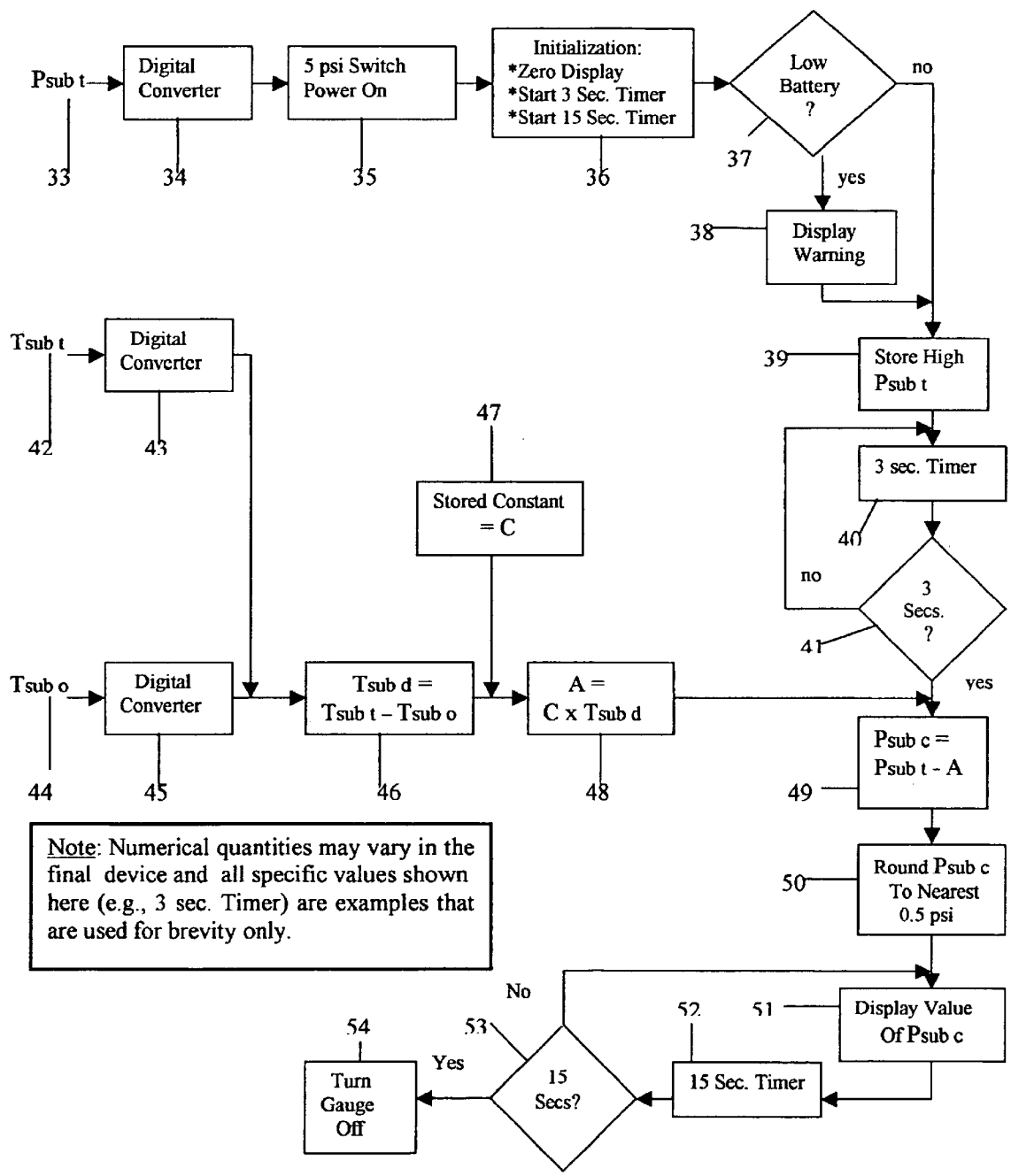

TIRE PRESSURE GAUGE WITH TEMPERATURE CORRECTION

CROSS-REFERENCE TO RELATED APPLICATIONS (not applicable)

STATEMENT REGARDING FEDERALLY SPONSORED RESEARCH OR DEVELOPMENT (not applicable)

REFERENCE TO SEQUENCE LISTING, A TABLE, OR A COMPUTER PROGRAM LISTING COMPACT DISK APPENDIX (not applicable)

BACKGROUND OF THE INVENTION

The state of the art of current hand-held tire air pressure gauges does not provide a useful measure of the proper tire inflation pressure if the vehicle has been recently driven. Driving causes flexing/friction within the tire and that results in elevated tire internal temperatures and related higher tire pressures. Such increases can be significant: Tire pressures can increase by 2–3 psi in only a couple of miles of local driving and, after prolonged highway driving at high speeds, can result in increases of six psi or more. In fact, typical vehicle and tire manufactures' instructions indicate that tire pressures should only be measured after the vehicle has been standing for at least three hours. The problem, however, is that tire inflation facilities are generally located remotely from the vehicle owner and the tire temperatures and pressures have become inflated from driving the vehicle to the gas station or on a trip. If the tire pressures have increased by five pounds due to highway driving, for example, a current tire gauge would indicate that the tires are over-inflated and may lead the user to release air from the tires and cause them to be under-inflated by five pounds.

Improperly inflated tires on a vehicle can cause increased tire wear, decreased fuel mileage, poor handling, unsafe driving conditions, and even the possibility of a tire blow-out. These concerns led to this hand-held digital tire pressure gauge that is designed to correct for any elevated tire temperatures/pressures that are due to driving the vehicle.

BRIEF SUMMARY OF THE INVENTION

A hand-held digital tire air pressure gauge has a spring-loaded piston that is compressed by air pressure from the tire to allow a calibrated volume of inner air from the tire to enter the gauge where sensors measure the tire gauge pressure and the temperature of the sampled air from the tire. A separate sensor mounted externally on the gauge body measures the ambient (outside of the tire) air temperature and the difference between the measurements of the two temperature sensors is determined. This temperature difference, along with the tire air gauge pressure and an adjustment factor derived from the known behavioral relationship between air pressure and air temperature, are analyzed by a series of digital electronic calculations in an equation to calculate a "corrected" tire air pressure which is indicated on a digital display. (See the specifics of this equation in the detailed description for FIG. 1E and also in FIG. 2) This corrected pressure is the air pressure that the tire would have if it had the same internal temperature as the temperature of the air outside of the tire.

The equation described in this application assumes that there is a linear relationship between air pressure change and air temperature change, and this assumption is probably sufficiently accurate in the temperature ranges expected for this application. However, nonlinear relationships could also be accommodated.

As previously pointed out in the background section, driving a vehicle will result in an increase of the air temperatures within the tires. This gauge, however, by correcting for this type of elevated tire temperatures, will allow the vehicle owner to drive to a service station or to check the tire pressures while on a trip and to still obtain valid tire air pressure readings. For example, if the vehicle manufacturer recommended thirty pounds of pressure when the tire is "cold", and this gauge indicated a "corrected" tire pressure of twenty-five pounds when the tire is hot due to highway driving, the user could confidently add five pounds of air to the tire and know that the tire will be properly inflated. If he adds the five recommended pounds and later checks the tire when the vehicle has not been recently driven, the gauge will indicate the correct tire pressure of thirty pounds.

The design of the piston/spring/displacement chamber mechanism within the gauge ensures that a sufficient volume of tire air enters the displacement chamber for an accurate tire air temperature measurement without allowing a significant loss of tire air pressure (estimated loss of less than one-eighth of a psi for the specifications used here). No special action is required by the user other than pressing the gauge against the tire stem as he would with any hand held digital tire air pressure gauge. Further, since the piston movement is driven first by tire air pressure and then by a return spring, there is no battery power required and thus no drain on the gauge battery during its operation. The external temperature sensor is located at the opposite end of the gauge from the tire temperature sensor to ensure that there is no temperature influence from the tire. The external temperature sensor is also protected by a plastic grid that is designed such that it discourages nearby hand placement that could unduly influence the sensor reading.

BRIEF DESCPRIPTION OF THE SEVERAL VIEWS OF THE DRAWING

FIG. 1D is a sectional view taken lengthwise through the gauge body and portrays the main interior components for when the gauge is not under pressure from the tire. In this state the piston shown is at rest and the spring is not compressed.

FIG. 1E is also a lengthwise sectional view of the same components as in FIG. 1D but portrays the gauge when it is under pressure from the tire with the piston moved upward in the cylinder and the spring being compressed.

FIG. 2 is a flowchart/logic diagram that indicates the sequential steps that are processed within the circuit board and electronic components to obtain the desired tire pressure reading to be displayed.

DETAILED DESCRIPTION OF THE INVENTION

Figure 1A:
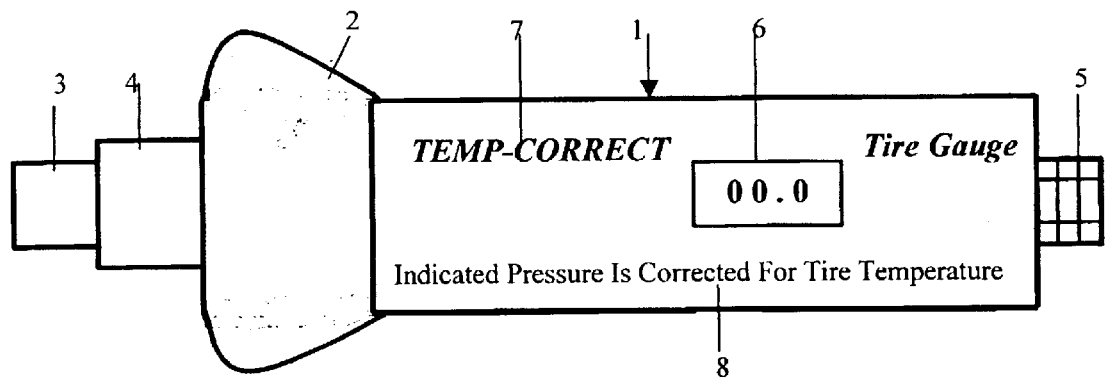
FIG. 1A is an outside lengthwise view of the portion of the gauge that shows the main body and, along with other features, the nozzle that engages the tire stem, the grid that protects one of the temperature sensors, and the LCD display. This view would be suitable for inclusion on the front page of the patent application publication and patent as the illustration of the invention.

Referring now to the various diagrams in more detail: FIG. 1A shows the gauge body 1 which is a molded hard plastic material with a corrugated surface to assist the user's grip. It is approximately one and one-quarter inches in outside diameter and about six inches in total length including the plastic nozzle 3 and plastic shoulder 4 on the front end and the plastic protective grid 5 at the back end. The body 1 is manufactured in two lengthwise halves that can optionally be permanently sealed together after all of the internal components have been assembled during the manufacturing process. There is also a plastic grip ring 2 molded around the outside of and protruding from the gauge body 1 at the end near the shoulder 4 to further assist the user's grip while pushing the gauge body 1 against the tire stem. A display such as a liquid crystal display (LCD) unit 6 indicates the temperature-corrected tire pressure in pounds per square inch (psi) to the nearest one-half pound. Other pressure measurement scales could also be used. The name of the gauge 7 (herein tentatively called "TEMP-CORRECT Tire Gauge") is painted on the gauge body 1 in a color contrasting to the gauge body 1 color. A statement 8 notifying the user that the indicated pressure has had a correction for tire temperature is also applied to the gauge body 1 in a color contrasting to the gauge body 1 color.

Figure 1B:
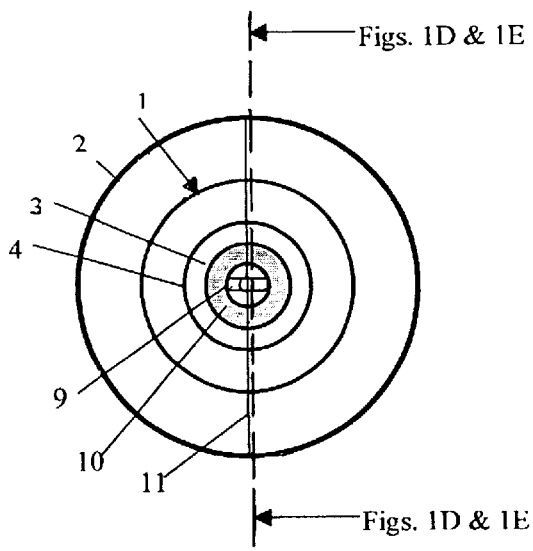
FIG. 1B is a view of the nozzle end of the gauge primarily showing the protrusion that depresses the tire valve, the air entry hole, the rubber seat, and the permanent seal between the two halves of the gauge body that was left from the manufacturing process. The broken line on the drawing indicates the plane on which two sectional views are taken.

A view of the gauge from the end that engages the tire stem is shown in FIG. 1B. Each of the concentric rings, starting from the outermost ring and moving inward to the innermost ring, is notated as follows: the grip ring 2, the main gauge body 1, the nozzle 3, the shoulder 4, the protrusion/air entry hole part 9, and the rubber seat 10. The parts 1,2,3,4 were described in the description for FIG. 1A. The protrusion/entry hole part 9 is a hard plastic or brass piece that depresses the tire stem valve and has a slot and a hole (similar to those on most current tire gauges) to permit air from the tire to enter the gauge through the nozzle 3. The seat 10 is a soft rubber or plastic ring that provides a seal between the tire stem and the gauge nozzle 3 to prevent the pressurized tire air from escaping while they are engaged. The seam 11 is the permanent seal line left when the two halves of the gauge body 1 were bonded together at the end of the manufacturing process. Also shown in this view is the broken line indicating the plane upon which two sectional views (FIG. 1D and FIG. 1E) were taken.

Figure 1C:
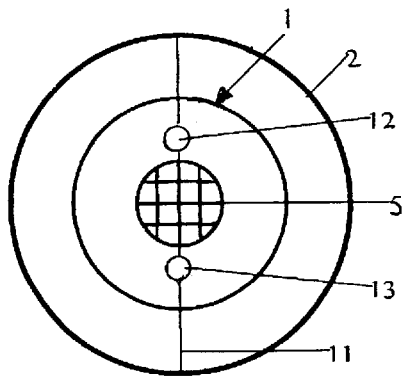
FIG. 1C shows the other (back) end of the gauge indicating the grid protecting one of the temperature sensors and the two vent holes.

The design of the back end (the end opposite from the nozzle end) of the gauge is shown in FIG. 1C. Each of the three concentric rings, starting with the outermost ring and moving inward to the innermost ring is notated as follows: the grip ring 2, the main gauge body 1, and the grid 5 which is molded as part of the gauge body 1 and has grid-like structures around the perimeter and on the end in such a way as to be open to the movement of outside air through it. There are also two vent holes 12, 13 that are approximately one-eighth of an inch in diameter that allow air movement from inside of the gauge body 1 to outside of the gauge body 1. The number and size of these holes may be varied. Also shown again is the seam 11 left when the two halves of the gauge body 1 were sealed at the end of the manufacturing process. The purposes of the grid 5 and of the two vents 12, 13 will be addressed in the detailed description of FIGS. 1D & 1E.

Figure 1D:
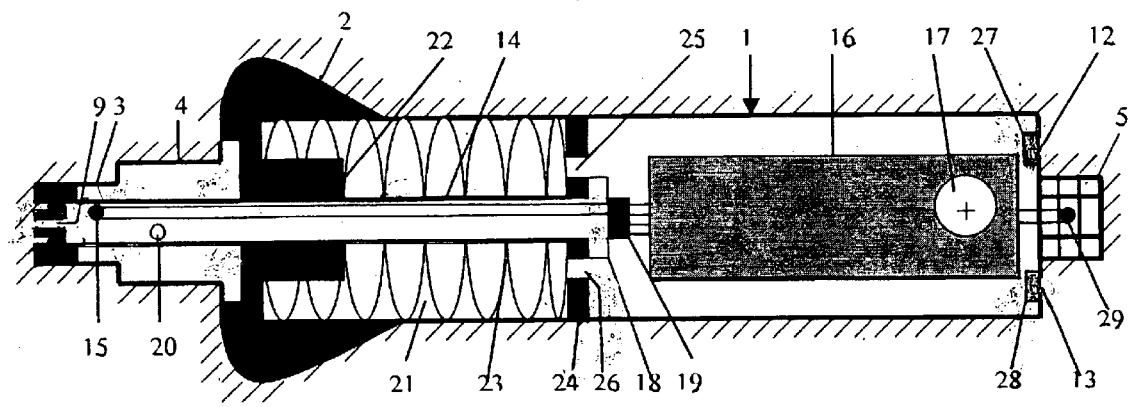
FIG. 1D and FIG. 1E.
Figure 1E:
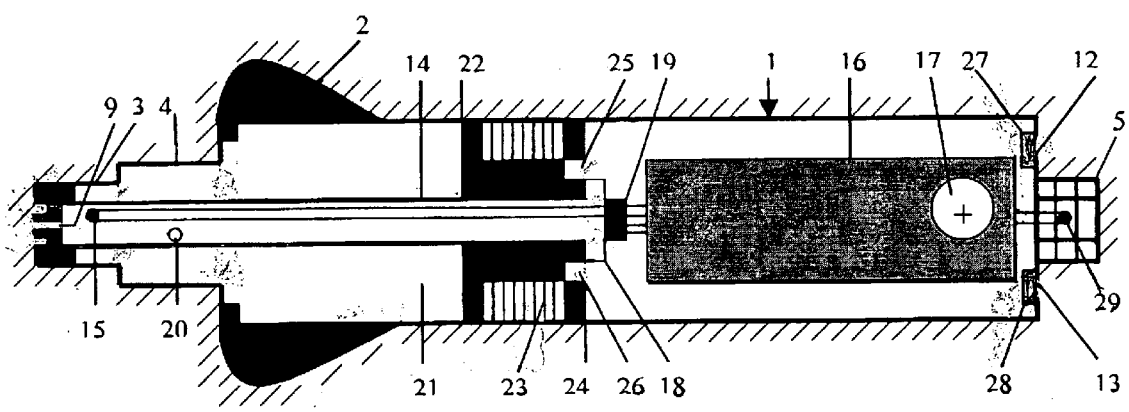

FIGS. 1D & 1E are both lengthwise sectional views as indicated by the broken line in FIG. 1B and they both show the same internal parts of the gauge. FIG. 1D, which shows the parts of the gauge when there is no air pressure from a tire applied to it, will be used to describe in detail the design and structure of each of the internal parts. FIG. 1E shows the same parts as in FIG. 1D but will be used to indicate how the various parts are affected when air pressure from the tire is applied to the gauge and will be used to describe the function of each of the parts in the overall operation of the gauge.

Starting at the nozzle 3 end of the gauge in FIG. 1D, the protrusion/air entry hole part 9 described in FIG. 1B is soldered or glued or otherwise attached to the metal (e.g. brass or aluminum) tube 14 which is approximately one-quarter of an inch in diameter and about three and one-half inches in length. The tube 14 is attached in a sealed fashion at the opposite end to the pressure sensor chamber 18, which in turn is attached to the divider wall 24 that is an integral plastic portion of the gauge body 1. The fast-acting (about one-to-three seconds) tire temperature sensor 15, which may be a thin-wire thermocouple or comparable temperature sensor, is housed in the tube 14 near the nozzle 3 end, and the insulated conducting wires of the tire temperature sensor 15 run through the tube 14 to the pressure sensor module 19, e.g., a diaphragm/strain gauge, which is attached to the pressure sensor chamber 18. Both the conducting wires of the tire temperature sensor 15 and the conducting wires of the pressure sensor module 19 are connected to the circuit board 16 to which are attached the battery 17 and all of the electronic components required in the operation of the gauge. The outside air temperature sensor 29 (also may be a thin wire thermocouple or comparable fast-acting temperature sensor) is housed in the open-air grid 5 and its conducting wires are also connected to the circuit board 16. A piston 22 is positioned within the gauge body 1 near the shoulder 4 and encircles the tube 14 which it uses as a guide. A corrosion-resistant, e.g., stainless steel, coil compression spring 23 is housed in the gauge within an area called the displacement chamber 21 and is under compression between the piston 22 and the divider wall 24. The displacement chamber 21 is a cylindrical chamber within the gauge body 1 that is designed to hold a calibrated amount of air from the tire and it is about one inch in diameter by approximately two inches long. A pressure hole 20, which is approximately one-sixteenth of an inch in diameter, is placed in the tube 14 within the shoulder 4 area above (to the piston 22 side of) the temperature sensor 15. Two vent holes 25,26 that are approximately one-eighth of an inch in diameter are placed in the divider wall 24 on either side of the pressure sensor chamber 18. Also, the two one-eighth of an inch vent holes 12,13 that were previously shown in FIG. 1C are indicated at the back end of the gauge body 1 on each side of the grid 5. Two filters 27,28, each approximately one-quarter of an inch square and about one-eighth of an inch thick, that may be made of a pad of fine fibers, e.g. fiberglass, are glued over the vents 12,13 on the inside of the gauge body 1 to avoid contamination to the electronic components inside of the gauge. The number and size of all referenced holes may vary in the final device.

FIG. 1E will be used to describe the functioning of each of the internal parts and the overall operation of the gauge when it is under pressure from the tire. Starting at the nozzle 3 end of the gauge, when the user applies the nozzle 3 to the tire stem and presses the gauge against it, the tire valve is depressed by the protrusion/air entry hole part 9 and air from the tire enters the gauge through the hollow tube 14. This increased air pressure also enters the pressure sensor chamber 18, and through the pressure hole 20 in the hollow tube 14, into the shoulder 4 area and the displacement chamber 21. This increased air pressure causes the piston 22 to move upward in the displacement chamber 21 and to depress the coil spring 23 until the shoulder portion of the piston 22 meets the divider wall 24 and closes off the two vent holes 25 & 26. The piston 22, spring 23, and displacement chamber 21 parts together comprise a passive mechanism (requiring no extra overt action by the user) that is designed to allow a sufficient volume (approximately one and one-half cubic inches) of air from the tire to enter the gauge to purge the tire stem and gauge nozzle 3 and to obtain an accurate reading by the tire temperature sensor 15 but without excessively reducing the tire pressure (estimated reduction less than one-eighth psi).

The air pressure within the pressure sensor chamber 18 actuates the pressure sensor 19 which sends a signal to the circuit board 16 which simultaneously also receives signals from the tire air temperature sensor 15 and the outside air temperature sensor 29. These three sensor signals are processed and analyzed by the circuit board 16 electronic components in the following equation: [$P_{sub}\ c = P_{sub}\ t - (T_{sub}\ t - T_{sub}\ o \times C)$] where $P_{sub}\ c$ is the corrected tire air pressure, $P_{sub}\ t$ is the actual tire pressure, $T_{sub}\ t$ is the tire air temperature, $T_{sub}\ o$ is the outside (of tire) air temperature, and C is a constant value (estimated here at 0.08 psi per degree Fahrenheit) which is the normal variance of air pressure as its temperature changes. This result derives a tire air (gauge) pressure that has been "corrected" to account for any elevated tire temperature (above outside air temperature) that is due to tire friction as a result of driving the vehicle. As an example, if the actual highest-read tire gauge pressure ($P_{sub}\ t$) is thirty psi, the tire air temperature ($T_{sub}\ t$) is one hundred and twenty two degrees Fahrenheit, and the outside air temperature ($T_{sub}\ o$) is sixty degrees Fahrenheit, the corrected tire gauge pressure ($P_{sub}\ c$) would be calculated as follows:

$P_{sub}\ c = P_{sub}\ t - (T_{sub}\ t - T_{sub}\ o \times C)$ $P_{sub}\ c = 30 - (122 - 60 \times 0.08)$ $P_{sub}\ c = 30 - (62 \times 0.08)$ $P_{sub}\ c = 30 - (4.96)$ $P_{sub}\ c = 25$ psi Therefore, the corrected tire air pressure calculated in this example is twenty-five pounds. If the tire or vehicle manufacturer recommended thirty pounds of "cold" tire air pressure when the vehicle has not been recently driven, then the user should add five more pounds to the tire to obtain an accurate inflation pressure. The range of pressure measurement is probably in the order of 5–150 psi. Measurement scales other than Fahrenheit and psi could also be used.

This calculated corrected tire air pressure is transmitted to and displayed by the digital display 6. After the gauge nozzle 3 has been removed from the tire stem and the pressure released from the displacement chamber 21, the coil compression spring 23 depresses the piston 22 back down to its resting position at the bottom of the displacement chamber 21 near the shoulder piece 4. After a predetermined period of time (e.g., 10–15 seconds) has elapsed, the gauge will shut off to conserve the battery.

Figure 1F:
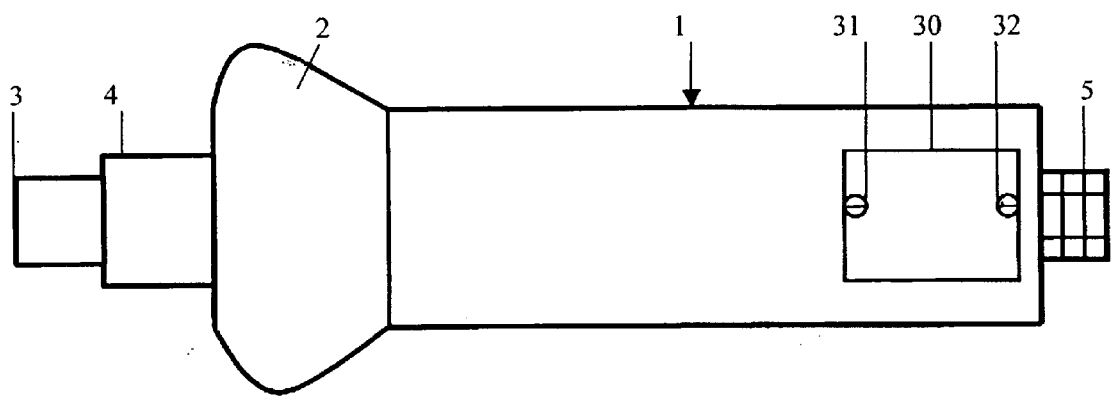
FIG. 1F is an outside lengthwise rear view of the gauge for the purpose of showing the compartment door for access to the battery compartment to permit replacing the battery.

FIG. 1F is a lengthwise outside view of back of the gauge (opposite side from the digital display 6) to show the gauge body 1, grip ring 2, nozzle 3, shoulder 4, grid 5 and the battery compartment door 30 with its two attachment screws 31 & 32. The purpose of the battery compartment door 30 is to allow access to replace the battery 17 as necessary.

FIG. 2 is a logic diagram/flow chart depicting the sequential steps taken by the various electronic components in processing the inputs from the pressure and temperature sensors, calculating a "corrected" tire air pressure taking into account the tire temperature (vs. the outside temperature), and displaying the result. The following is an explanation of each of the steps.

$P_{sub}\ t$ 33 is the pressure of the tire in analog form and is converted into digital format by the digital converter 34. The gauge is turned on by the switch 35 when the pressure reaches a predetermined minimum pressure. e.g., five psi and the initialization process 36 is started in order to zero the digital display, start the (approximate) three-second timer 40 and start the (approximate) fifteen-second timer 52. At this point, a low-battery check 37 causes a warning to be displayed if the battery power is low enough to affect the operation of the gauge and a storage device 39 saves the highest tire pressure reading that was reached since pressure was first applied to the gauge. The timer 40 is monitored at step 41 and the subsequent operation will be allowed to proceed when sufficient time has elapsed (approx. 1–3 seconds) to permit the temperature sensors to react to the temperature changes.

At this point the tire temperature reading input ($T_{sub}\ t$) 42 is digitized 43 and the outside (of the tire) temperature reading input ($T_{sub}\ o$) 44 is also digitized 45 and the value $T_{sub}\ d$ is calculated in step 46 by subtracting the outside air temperature ($T_{sub}\ o$) from the tire temperature ($T_{sub}\ t$). The constant (C), which is the numerical value representing the amount of change in air pressure normally experienced as its temperature changes, is introduced in step 47 and is multiplied times the value $T_{sub}\ d$ in step 48 to obtain the value denoted as A. If the (approximate) three seconds (from step 41) have elapsed, $P_{sub}\ c$ is calculated in step 49 by subtracting the previously determined value of A from the digitized tire pressure ($P_{sub}\ t$). $P_{sub}\ c$ is the "corrected" tire air pressure that the tire would have if the tire temperature was the same as the outside (of the tire) air temperature, i.e., if the tire temperature were not elevated due to driving the vehicle. The value of $P_{sub}\ c$ is rounded e.g., to the nearest one-half psi in step 50 and transmitted to the LCD display in step 51. The measured pressure range may vary but is probably in the order of 5–150 psi. The time as determined by the timer 52 is checked in step 53 and the gauge is turned off in step 54 to conserve battery power when a sufficient number of seconds have elapsed. All actual numerical quantities may vary in the final design and the specific values depicted here are used as examples only.

What is claimed is:

1. A method for deriving a valid tire pressure reading even after the vehicle has been recently driven and comprising:
   a means to obtain a carefully-measured volume of air drawn from within the tire to flow over a temperature sensor and into an internal air chamber in the gauge;
   a means to provide a delay time that disregards the initial said volume of air so as to purge the air pathways into the gauge and to allow the temperature sensor to acclimate to the changed air temperature;
   a means to determine the ambient (outside of tire) air temperature also with a delay time to permit the sensor to acclimate;

a means to determine the internal tire (gauge) pressure;

an equation:$[P_{sub} c = P_{sub} t - (T_{sub} t - T_{sub} o \times C)]$ where $P_{sub} c$ is the corrected tire air pressure, $P_{sub} t$ is the actual tire pressure, $T_{sub} t$ is the tire air temperature, $T_{sub} o$ is the outside (of tire) air temperature, and C is a constant value representing the normal variance of air pressure as its temperature changes (estimated here at 0.08 psi per degree Fahrenheit) calculates a "corrected" tire air pressure, wherein the said "corrected" tire pressure is a valid (equal to a "cold" tire) pressure reading even if the vehicle has been recently driven.

2. The method of claim 1 further comprising a passive (requiring no extra overt action by the user) piston and spring mechanism within an internal displacement air chamber that requires no battery power and wherein said piston is initially moved upward by the tire air pressure and shutting off, in positive manner, any further air entry into the gauge, after which said piston is then returned to the initial resting position by said spring following release of pressure from said gauge.

3. The method of claim 1 further comprising a fast-acting temperature sensor placed strategically within said gauge such that it ensures accurate tire air temperature measurement.

4. The method of claim 1 further comprising a hollow tube within said gauge which acts in the multiple capacities of: conveying tire air to said displacement chamber as well as to a pressure sensor, providing a protected conduit for said tire temperature sensor wires, and serving as a guide for said piston within said air chamber.

5. The method of claim 1 further comprising a fast-acting ambient air temperature sensor strategically placed within a protective grid on said gauge where it is free from temperature influences from either tire air or user's hand.

6. The method of claim 1 further comprising an automatic digital delay timer providing sufficient time following initial applied air pressure to allow for acclimation of temperature sensors.

7. The method claim 1 further comprising electronic circuits and components that accept the highest measurement of said tire pressure sensor and the delayed results of said temperature measurements.

8. The method of claim 1 further comprising of vent holes between said air displacement chamber and said circuit board portion of said gauge and holes to vent air from within said circuit board portion to the outside of said gauge.

9. The method of claim 1 further comprising a grip ring around outside of said gauge body place to assist user's grip.

* * * * *